No. 799,841. PATENTED SEPT. 19, 1905.
D. ESSEX.
TAG.
APPLICATION FILED MAR. 6, 1905.
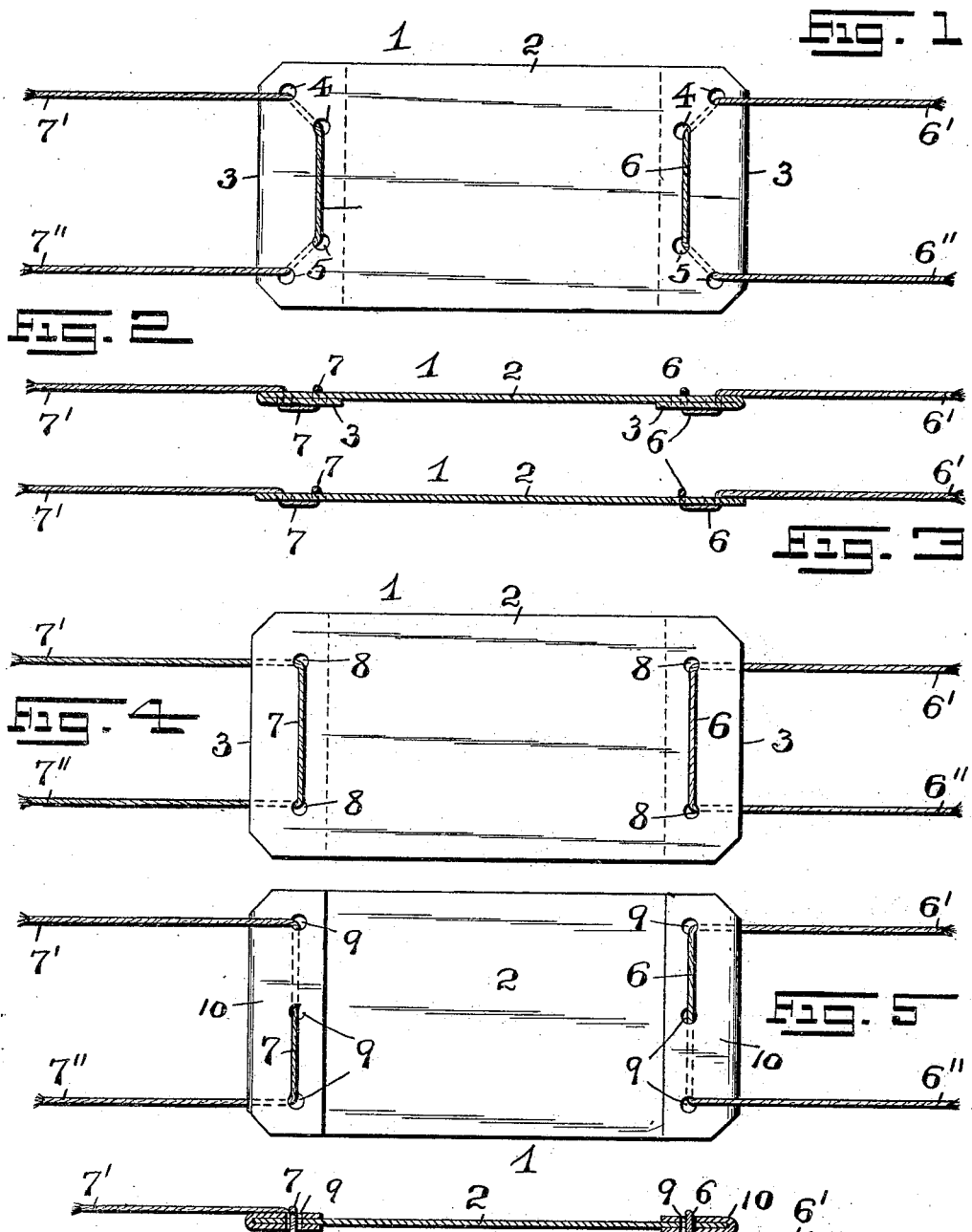

UNITED STATES PATENT OFFICE.

DAVID ESSEX, OF KEARNEY, NEW JERSEY.

TAG.

No. 799,841.  Specification of Letters Patent.  Patented Sept. 19, 1905.

Application filed March 6, 1905. Serial No. 248,449.

*To all whom it may concern:*

Be it known that I, DAVID ESSEX, a citizen of the United States, residing at Kearney, in the county of Hudson and State of New Jersey, have invented certain new and useful Improvements in Tags; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention relates generally to improvements in that class of tags or direction-labels which are to be attached by tying to packages for transmission through the mails or for transportation by freight or express; and the invention is designed to provide a novel tag or direction-label of the general construction hereinafter more fully set forth with a view of providing a simple and strong tag to be attached at its opposite ends to a package so as to lie flat upon and conform to the general surface configuration of the package, whereby the tag is less liable to be torn or otherwise become useless by disfiguration.

Other objects of this invention not at this time more particularly specified will be clearly understood from the following detailed description of the invention.

The invention consists, therefore, in the novel form of tag or direction-label hereinafter set forth; and, furthermore, this invention consists in the various arrangements and combinations of parts and the details of the construction of the same, all of which will be hereinafter more fully described and then finally embodied in the clauses of the claim, which are appended to this specification and form an essential part of the same.

My invention is clearly illustrated in the accompanying drawings, in which—

Figure 1 is a plan view of one form of tag embodying the principles of my present invention, and Fig. 2 is a central longitudinal section of the same. Fig. 3 is a central longitudinal section of a slightly-modified form of tag, but still embodying the principles of this invention. Figs. 4 and 5 are plan views of two other forms of tags made according to my present invention, and Fig. 6 is a central longitudinal section of the form of tag shown in said Fig. 5 of the drawings.

Referring now to the several figures of the said drawings, the reference character 1 indicates the complete tag or direction-label, to be attached to packages of the various kinds and adapted for use as shipping or identification tags or classification-labels.

In Figs. 1, 2, 3, 4, 5, and 6 of the drawings I have shown the preferred form of tag or label, the same consisting of a main body 2, made from stout paper or cardboard or any other suitable material, the said body being provided at its respective ends with the folded-over portions or laps 3, as illustrated, and being preferably cut away at its corners, as shown. The arrangement of the folded-over portions or laps 3 is preferable on account of the reinforcement of the body 2 at its end portions thus obtained at the points where strength is required; but of course it will be understood that the said folded-over portions or laps 3 are not an absolute necessity and may be dispensed with, as clearly indicated in Fig. 3 of the drawings. In the form of tag represented in said Figs. 1, 2, and 3 I have provided the said body 2 and its folded-over portions or laps 3, when the latter are employed, with four holes or perforations, near each end of the body, the said holes or perforations being arranged in pairs 4 and 5 and being preferably staggered in the manner shown. A string or tying-cord 6 and 7 is inserted at each end of the said body 2 in the said arrangements of holes or perforations 4 and 5, substantially in the manner shown, the said string or cord 6 having a pair of free end portions 6' and 6'', and the string or cord 7 having a pair of free end portions 7' and 7''.

In applying the tag to a package the shipping directions or other matter for the purposes of identification or classification is written, printed, or otherwise applied to the face of the body 2 of the tag, said body being arranged or placed upon or about the package and fastened in position by tying the end portion 6' of the string or cord 6 to the end portion 7' of the string or cord 7, and also tying the end portion 6'' of the string or cord 6 to the end portion 7'' of the said string or cord 7. It will thus be seen that the said tag and its strings or cords 6 and 7 also serve the double purpose of tying or securing the package itself, and the tag being attached at its opposite ends and lying directly upon and conforming to the face of the package it cannot become torn or otherwise damaged, as is so often the case with the present forms of tags which are attached to the package at one end only.

My novel form of tag is of great advantage in mailing purposes—as, for instance, in its attachment to newspapers and other packages which are rolled or folded—as it permits the operators at the post-offices to readily see the mailing directions and more readily allows for the cancellation of the stamps placed upon the tag. Furthermore, the arrangement of the holes or perforations with which the tag is supplied is such that the tearing strain exerted by the strings or cords will be evenly distributed over different portions of the tag, and there is less danger of the body of the tag pulling loose from the strings or cords than with a tag having but one hole in which the string is arranged and attached to the tag.

Instead of using four holes or perforations at each end of the body 2 of the tag and staggering them in the manner shown in said Figs. 1, 2 and 3 two holes or perforations 8 may be arranged in each end of the body of the tag, as represented in Fig. 4, or each end portion of the body of the tag may be provided with an arrangement of three holes or perforations 9, as illustrated in Fig. 5 of the drawings, the said strings or cords 6 and 7 being passed through the holes or perforations 8 and 9 in the respective tags, as shown, and their ends tied about the package in the manner hereinabove described. If desired, the end portions of the body of the tag may be reinforced by the arrangement upon the top and bottom end surfaces of the body of the tag of a lap 10, the same extending over and around the marginal edge of each end portion of the body of the tag, as clearly illustrated in Figs. 5 and 6 of the drawings.

From the foregoing description of my present invention it will be seen that I have produced a simply-made and cheap tag, which can be easily attached to a package and has these great advantages—that the written or printed matter upon the tag when attached to a package can be easily and quickly read, and, furthermore, the tag-body cannot become torn away or disconnected from the string nor otherwise easily defaced, as is at present ordinarily the case.

Having thus described my invention, what I claim is—

1. A tag comprising a body, a turned-over lap at each end of said body, and a string or cord connected with each end and the turned-over lap of the said body, and each string or cord having a pair of free end portions extending from each end of the tag, whereby the tag can be arranged and secured in a flat condition upon a package, substantially as and for the purposes set forth.

2. A tag comprising a body, a turned-over lap at each end of said body, both the said body and said laps being provided with a plurality of perforations at the ends of the tag, and a string or cord at each end of said body, each string or cord being inserted in the perforations at the respective ends of the tag, and having their free end portions extending from the ends of the tag, whereby the tag can be arranged and secured in a flat condition upon a package, substantially as and for the purposes set forth.

3. A tag comprising a body, said body being provided at each end with two pairs of perforations, said perforations being staggered, and a string or cord at each end of said body, each string being inserted in the said staggered perforations and having their free end portions extending from the ends of the tag, whereby the tag can be arranged and secured in a flat condition upon a package, substantially as and for the purposes set forth.

4. A tag comprising a body, a turned-over lap at each end of said body, both the said body and said laps being provided with two pairs of perforations, said perforations being staggered, and a string or cord at each end of said body, each string being inserted in said staggered perforations and having their free end portions extending from the ends of the tag, whereby the tag can be arranged and secured in a flat condition upon a package, substantially as and for the purposes set forth.

In testimony that I claim the invention set forth above I have hereunto set my hand this 2d day of March, 1905.

DAVID ESSEX.

Witnesses:
FREDK. C. FRAENTZEL,
GEO. D. RICHARDS.